United States Patent [19]

Wykoff

[11] 4,192,747
[45] Mar. 11, 1980

[54] LIQUID-SOLID SEPARATOR

[75] Inventor: Richard H. Wykoff, Livonia, Mich.

[73] Assignee: AMSTED Industries Incorporated, Chicago, Ill.

[21] Appl. No.: 957,708

[22] Filed: Nov. 6, 1978

[51] Int. Cl.² .................................................. B01D 21/18
[52] U.S. Cl. ......................................... 210/83; 210/525; 210/526; 210/527; 210/532 R
[58] Field of Search ...................... 210/111, 406, 81, 83, 210/513, 521, 522, 523, 525, 526, 532 R, 532 S, 533, 536, 387, 534, 535, 108, 393, 408, 409, 411, 527

[56] References Cited

U.S. PATENT DOCUMENTS

| | | | |
|---|---|---|---|
| 2,999,597 | 9/1961 | Harms | 210/411 |
| 3,087,620 | 4/1963 | Hirs | 210/401 |
| 3,091,336 | 5/1963 | Hirs | 210/111 |
| 3,225,928 | 12/1965 | Black | 210/393 |
| 3,332,556 | 7/1967 | Hirs | 210/406 |

*Primary Examiner*—Frank Sever
*Attorney, Agent, or Firm*—John L. Schmitt; Fred P. Kostka; Edward J. Brosius

[57] ABSTRACT

A flow of liquid containing suspended solid particles enters a top inlet of a setting tank of a liquid-solid separator. The tank is of such dimensions that the liquid flows in a nonturbulent flow path under a lengthwise partition in the tank and through an outlet weir opening formed in the tank on a side opposite the inlet. From the outlet the liquid may be returned for further use in a process. Under the influence of gravity, a substantial portion of the solids in the flow slowly settles downward and collects to form a cake on a movable collection means serving as part of a bottom of the tank. Periodically the movable collection means is advanced toward a discharge point located exterior to the tank for convenient disposal of the solids collected on the movable surface.

4 Claims, 13 Drawing Figures

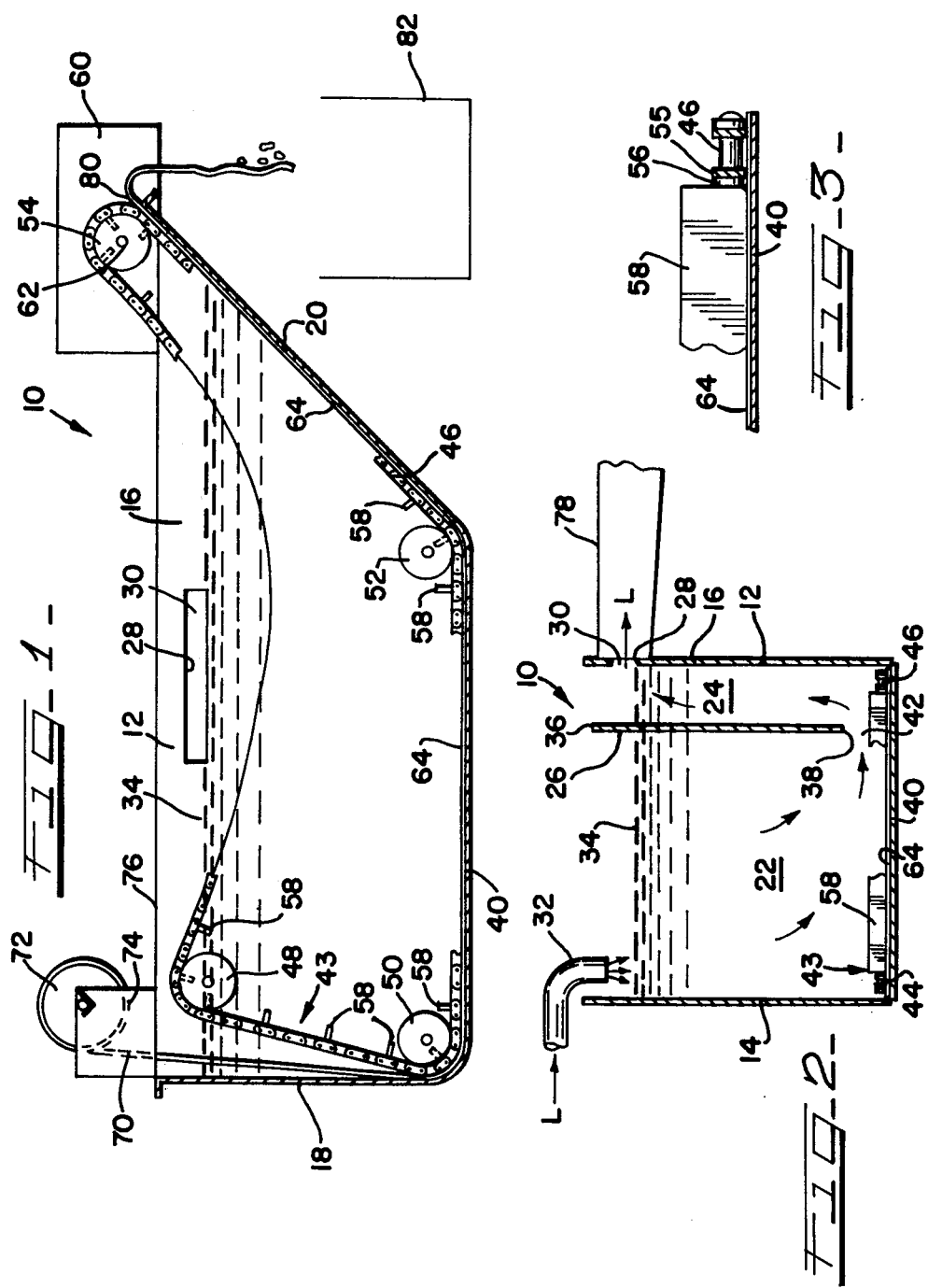

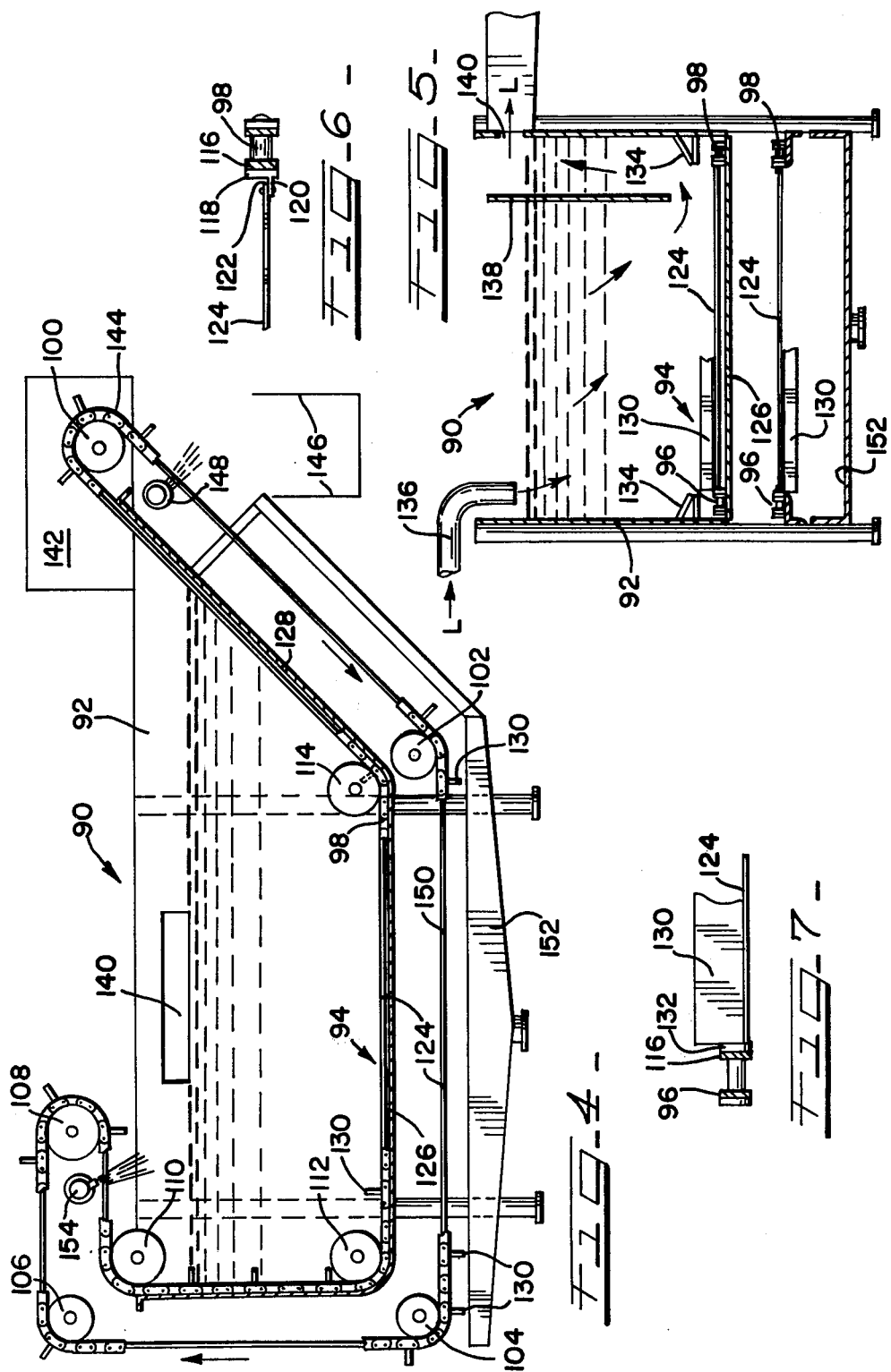

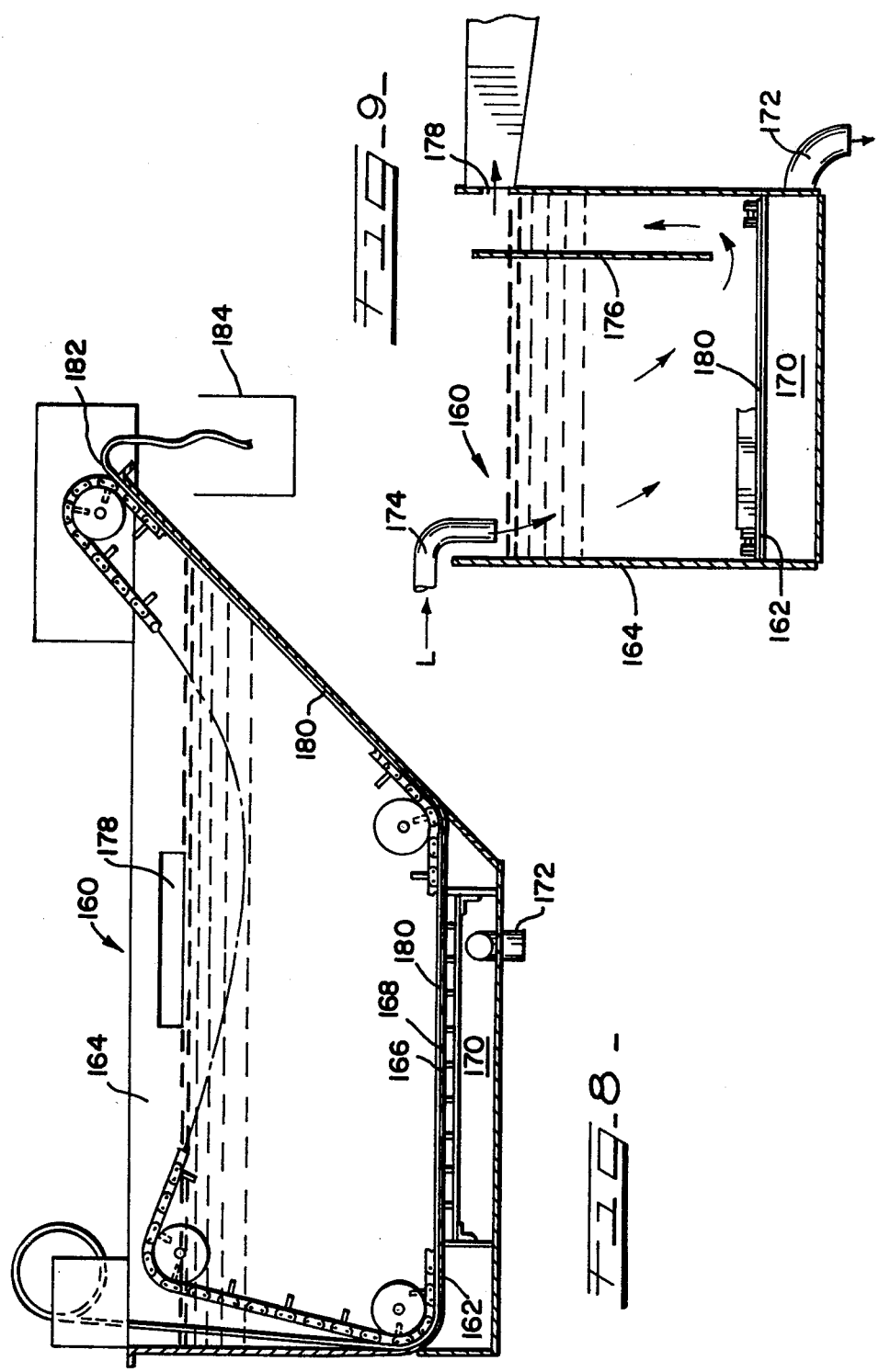

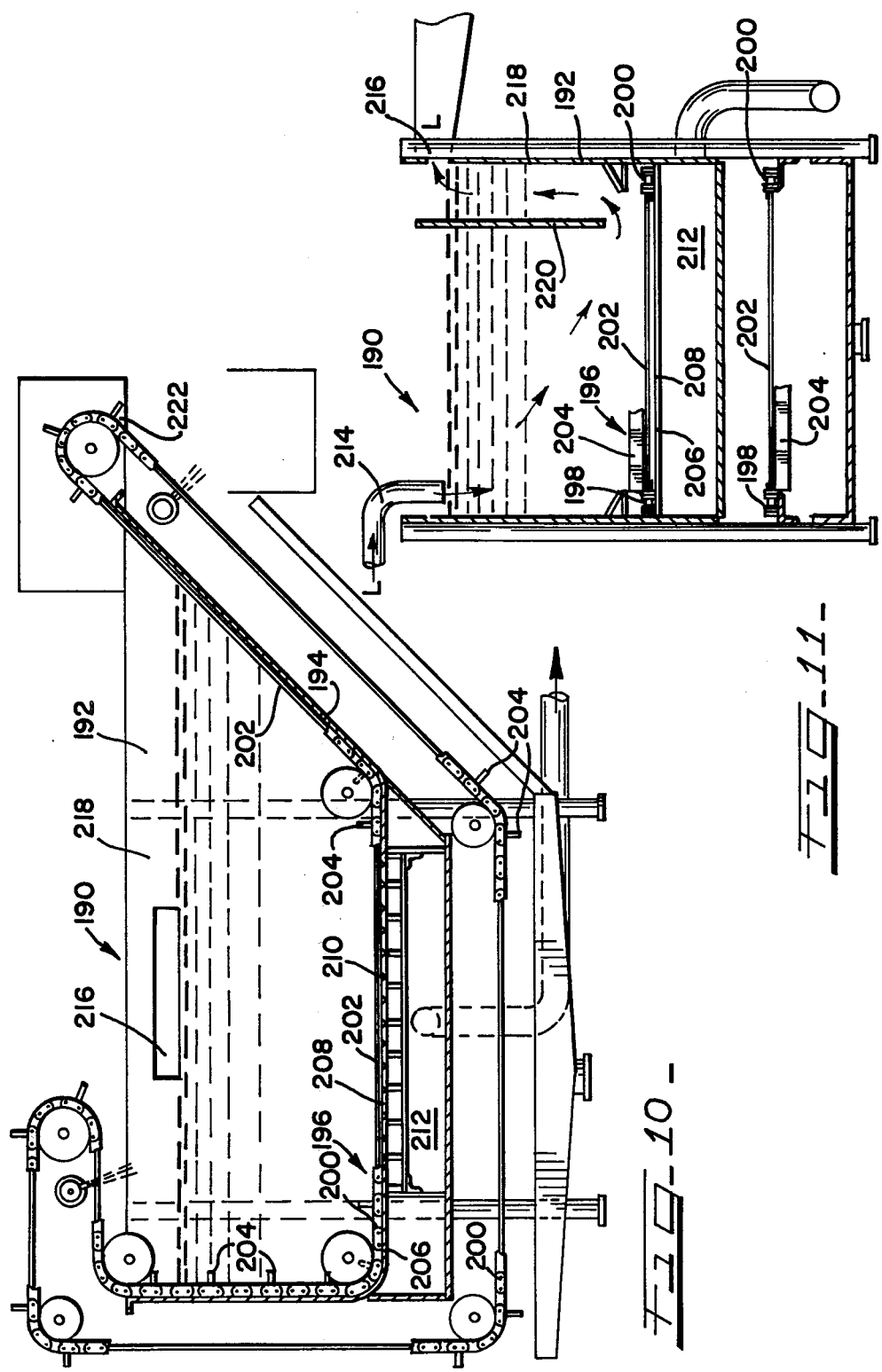

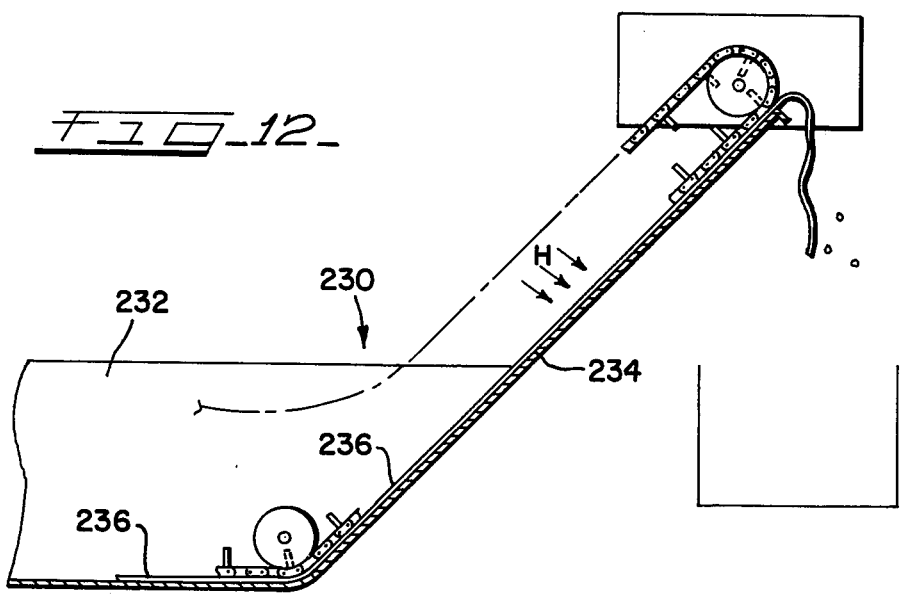
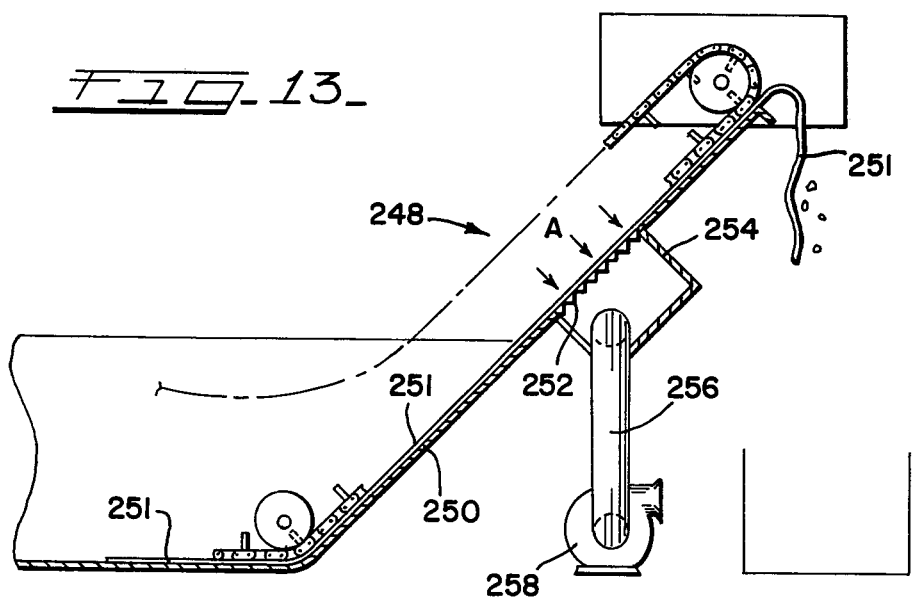

LIQUID-SOLID SEPARATOR

BACKGROUND OF THE INVENTION

1. Field of the Invention

This invention relates to liquid-solid separators and more particularly to a separator providing gravity separation of solids in a liquid flow and means providing efficient removal of the solids so separated.

2. Description of the Prior Art

The use of gravity as means to separate solids suspended in a liquid is well known. Settling ponds and the like have been in use for some time to accomplish such separation.

One well-known device utilizing gravity to provide separation is the API (American Petroleum Institute) separator. Gravity separation occurs because foreign matter in the liquid has a different specific gravity than the liquid.

Gravity separation thus may be two directional. For example, when oil, dirt and water are mixed, the oil will move upwardly to float on a surface of the water while the dirt, having a specific gravity greater than water, settles downwardly for collection in a bottom of a tank of the separator.

Separation may be accomplished mechanically as well by use of a filter bed of a granular filter media. Solids within the liquid become entrapped in interstices or voids in the media in the bed as the liquid flows through the bed.

Once separation has been accomplished, whether by gravity or mechanical means, the solids so separated must periodically be removed and accumulated. U.S. Pat. Nos. 3,087,620; 3,091,336 and 3,332,556 disclose apparatus incorporating mechanical filtering means and means for periodic removal of the separated solids to allow continuous operation.

SUMMARY OF THE INVENTION

A liquid-solid separator of this invention includes a tank so sized to provide a nonturbulent flow therethrough. A flow of liquid containing suspended solid particles is received by the tank through a top inlet. The liquid flows downwardly under a lengthwise partition and then upward to and from a top weir outlet located on a side of the tank opposite the inlet.

The difference between specific gravity of the liquid and of the solids is such that the solids in part settle downwardly under the influence of gravity to collect on a movable collection means carried by the tank. The flow rate in and out of the tank with respect to the dimensions of the tank is such that there is proximately 80 percent liquid-solid separation.

Where the size and other physical characteristics of the solid particles is such that gravity alone will not effect an 80 percent separation, then a pass-through section is added to a bottom of the tank below the movable collection means where proximately 10 to 15 percent of the flow may be drawn off. Flow through the pass-through section promotes solid collection of the solids on the movable surface which when combined with gravity separation allows the separator to effect the 80 percent separation noted.

The use of the pass-through section also provides a source of the liquid having a near 100 percent removal of the solid particles since the movable collection means and cake of solids collected thereon acts as a highly efficient mechanical filter.

The movable collection means on which the solids collect may be of a number of configurations. For example, a disposable cloth belt may be used. The belt with the solids collected thereon may be readily disposed of in a waste container exterior of the tank. As another example, the movable collection means may be of a permanent nature allowing a continuous reuse thereof. When the separator has a pass-through section, the movable collection means must also be porous to allow the passage of liquid. A belt made of a nylon material in a predetermined weave has been found to be superior for this use.

As solid particles collect on the movable collection means, the particles form into a cake. Periodically the movable collection means is advanced toward a point exterior to the tank such that a portion of the collected solids are withdrawn from the tank with each advancement. In this manner, the separator may operate continuously since the amount of collected solids within the tank is closely controlled.

There are several important advantages of the liquid-solid separtor of this invention over other known devices.

First, primary separation is achieved by use of gravity rather than by mechanical separation. Therefore, no filter media rejuvenation or use of a disposable filter media is required. As a result, the volume of liquid processed by this separator with respect to its size is substantially increased.

Secondly, the use of a movable collection means for accumulation of the separated solids provides for a convenient removal of such solids from the tank for external disposition.

Further, the use of a pass-through section below the movable collection means not only provides a limited source of near solid-free liquid but more importantly promotes separation of solids having a propensity to remain in suspension in the liquid flow. Gravity separation does not readily occur where the difference between the specific gravity of the liquid and the solids is small. Also gravity separation is inhibited where the particle size of the solids is particularly small. Small particles have a tendency to remain in suspension in the liquid since the force of gravity on such particles is not substantially greater than those forces resisting movement of the particles in the liquid.

Gravity separation and collection of solid particles which have acquired a like electrical charge have also proved difficult. The use of the pass-through section provides a force to assist in solid separation and accumulation into a compact and movable cake.

DESCRIPTION OF THE DRAWINGS

FIG. 1 is a cross-sectional view taken longitudinally through a liquid-solid separator of this invention.

FIG. 2 is a cross-sectional view taken transversely through the separator of FIG. 1.

FIG. 3 is an enlarged detail view of a portion of the separator of FIG. 2.

FIG. 4 is a cross-sectional view taken longitudinally through a second embodiment of the separator of this invention.

FIG. 5 is a cross-sectional view taken transversely through the separator of FIG. 4.

FIG. 6 is an enlarged detail view of a portion of the separator of FIG. 5.

FIG. 7 is an enlarged detail view of a second portion of the separator of FIG. 5.

FIG. 8 is a cross-sectional view taken longitudinally through a third embodiment of the separator of this invention.

FIG. 9 is a cross-sectional view taken transversely through the separator of FIG. 8.

FIG. 10 is a cross-sectional view taken longitudinally through a fourth embodiment of the separator of this invention.

FIG. 11 is a cross-sectional view taken transversely through the separator of FIG. 10.

FIG. 12 is a partial cross-sectional view of a modification of the separator of this invention wherein a discharge point for the solids has been extended.

FIG. 13 is a partial cross-sectional view of a second modification of the separator of this invention wherein a supplementary drying means has been added to assist in removal of liquid within the cake of solids.

DESCRIPTION OF THE PREFERRED EMBODIMENT

A first embodiment of a separator of this invention is shown generally in FIGS. 1–3 and designated 10. The separator 10 includes a tank 12 having vertical sidewalls 14, 16, a vertical end wall 18 and an inclined end wall 20. The inclined end wall 20 may be positioned on a 45 to 60 degree angle as measured from the horizontal.

The tank 12 is divided into an inlet chamber 22 and an outlet chamber 24 by a lengthwise partition 26 so located that the volume of the inlet chamber 22 proximates 80 percent of the volume of the tank 12.

In the sidewall 16 forming part of the outlet chamber 24 is rectangular opening 28 providing a weir outlet 30 for a liquid L flowing into the inlet chamber 22 of the tank 12 through an inlet pipe 32. The size of the weir outlet 30 is such that the liquid L is maintained at a level 34 having only a small dimensional variation.

The partition 26 has a top edge 36 located above the weir outlet 30 and a bottom edge 38 positioned above a bottom 40 of the tank 12 to provide a passageway 42 for the liquid L to flow from the inlet chamber 22 to the outlet chamber 24.

It should be understood that the tank 12 may have more than one inlet pipe 32 and one weir outlet 30 so that flow through the passageway 42 is substantially uniform between the end walls 18, 20.

The separator 10 further has a movable collection means 43 comprising a pair of spaced chains 44 and 46 each formed into a continuous loop about pairs of spaced idle sprockets 48, 50, 52 and a drive sprocket 54. To an inside of every second side plate 55 of each chain link of the chains 44, 46 is a sidebar 56. Joined to each pair of aligning sidebars 56 is a transversely positioned flight baffle 58 having an elongated and rectangular configuration. If desired, the flight baffles 58 hold the chains 44, 46 just above the bottom of the tank 12 so as to minimize contact between such.

The pair of drive sprockets 54 is connected to a conventional drive 60 by means of a drive shaft 62 allowing the chains 44, 46 and the attached flights 58 to be selectively driven in a counterclockwise direction as viewed in FIG. 1.

Forming a movable support surface 64 between the flights 58, the bottom 40 and the inclined end wall 20 is a disposable belt 70 supplied from a belt roll 72 rotatively carried on spaced brackets 74. The brackets 74 are affixed to a top 76 of the tank 12 and extend above and to the rear of the pair of idle sprockets 48. The belt 70 merges with the chains 44, 46 and the flights 58 adjacent to the pair of sprockets 50 and is drawn along the bottom 40 and inclined end wall 20 of the tank 12 by the flights 58 when the chains 44, 46 and the flights 58 are advanced by the drive 60.

Through the inlet pipe 32 a flow of liquid L containing solid particles enters the tank 12 containing the liquid L at the level 34. The liquid L flows in a nonturbulent manner through the tank 12 by first moving downwardly and through the passageway 42. In the outlet chamber 24, the liquid L flows upwardly, through the weir outlet 30 and into an overflow trough 78. This flow path is depicted by the arrows in FIG. 2.

The rate (volume/time) of the flow into and from the tank 12 with respect to the volume of the tank 12 is such that the solid particles in the liquid L are gravity separated and settle downwardly to collect on the movable support surface 64 and form a cake thereon. Because the flights 58 extend upwardly and thus form spaces therebetween, the solids collected between the flights 58 remain particularly undisturbed by the flow of the liquid L from the inlet pipe 32 to the weir outlet 30. Proximately 80 percent of the solid particles in the liquid L are separated from the liquid L discharging through the outlet weir 30.

Periodically the drive 60 is energized to advance the movable collection means 43. This advance is of a short duration but sufficient to prevent the cake of solids becoming so thick that a remixing of the solids in the cake and the liquid L would occur.

The cake of solids moves upwardly on the inclined end wall 20 toward a discharge point 80 external to the tank 12 and adjacent to the pair of drive sprockets 54. The flights 58 prevent movement of the cake of solids on the belt 70 located on the inclined end wall 20. At the point 80, the belt 70 and cake of solids separate from the chains 44, 46 and flights 58 allowing the belt 70 and solids to be disposed of within a convenient container 82.

As best understood by reference to FIGS. 4–7, a second embodiment of this inventive separator is shown generally and designated 90. The separator 90 includes a tank 92 of a similar configuration as the tank 12.

Likewise, the separator 90 has a movable collection means 94 comprising a pair of spaced chains 96, 98 each formed into a continuous loop about a pair of drive sprockets 100 and pairs of idle sprockets 102, 104, 106, 108, 110, 112 and 114. The sprocket pairs 112 and 114 are located within the tank 92 while the sprocket pairs 102–110 are located external to the tank 92.

Attached to an inner side plate 116 of each second link of each chain 96, 98 is a modified L-shaped bracket 118 having a horizontal leg portion 120 projecting inwardly and forming a support for an outer edge 122 of a continuous belt 124. The belt 124 may be formed of a nylon cloth, for example, or other suitable material capable of being formed into a continuous loop and sufficiently porous to allow a passage of liquid. The leg portion 120 of the bracket 118 is so spaced that contact of the belt 124 with a bottom 126 and an inclined end wall 128 of the tank 92 is minimized.

The movable collection means 94 likewise includes transversely positioned flight baffles 130 connected to a flight bracket 132 attached to each alternate second inner side plate 116 of the chains 96, 98. The separator 90 may include side deflectors 134 to prevent the solid particles within the liquid L from settling on the chains 96, 98 if the solids are of such a nature to interfer with the operation of chains 96, 98.

During operation of the separator 90, a flow of the liquid L containing solid particles enters the tank 92 through a like inlet pipe 136. In a similar flow path as described for the separator 10, the liquid L flows downwardly under a lengthwise partition 138 and then upward and out of a weir outlet 140. During the flow from the inlet pipe 136 to the weir outlet 140, proximately 80 percent of the solid particles are gravity separated from the liquid L, collect on the belt 124 and form a cake.

Periodically, a drive 142 operatively connected to the pair of drive sprockets 100 is energized to advance the movable collection means 94 in a clockwise direction as seen in FIG. 4. With each such energization of the drive 142, a certain amount of the cake of solids on the belt 124 is removed from the tank 92 and released from the belt 124 at a point 144 adjacent to the drive sprockets 100 to fall into a container 146. A belt blow-off header 148 to supply an air blast may be used to improve solids-belt separation.

Beneath the inclined end wall 128 and a horizontal return portion 150 of the movable collection means 94 is a drip tray 152 to collect any excess liquid remaining on the belt 124 and the chains 96, 98.

Additionally, to insure that the belt 124 remains porous, a washing header 154 located above the tank 92 and between the sprockets 108, 110 may provide a source of liquid to clean the belt 124. The liquid from the header 154, after passing through the belt 124, collects in the tank 92.

As best understood by reference to FIGS. 8 and 9, a third embodiment of this inventive liquid-solid separator is shown generally and designated 160.

The separator 160 is similar to the separator 10 in many respects but further includes a bottom 162 of a tank 164 having a pass-through portion 166 therein. The pass-through portion 166 may be made of wedge wires 168, for example, which are so spaced to allow passage of the liquid L to a liquid-tight collection compartment 170 located below. Connecting to the compartment 170 is a discharge pipe 172.

During operation, the liquid L enters the tank 164 through an inlet pipe 174, flows downward and under a lengthwise partition 176 and then out of a weir outlet 178. Because of the pass-through section 166, proximately 85-90 percent of the liquid L is discharged through the weir opening 178 while the remainder of the liquid L passes into the compartment 170 and then is discharged through the pipe 172.

The use of the pass-through section 166 insures that at least 80 percent of the solid particles are separated from the liquid L before it leaves the tank 164 through the weir outlet 178. Separation of the solid particles is accomplished by gravity settling of the solid particles to collect and form a cake on a disposable porous belt 180. This separation is aided by the slight flow through the cake of solids, the belt 180, the pass-through 166 and into the compartment 170. In this manner, separation of smaller sized solid particles and solid particles which resist accumulation may be more easily achieved. To prevent any liquid from inadvertently by-passing the disposable porous belt 180, the pair of chains rests on the edges of the belt 180.

The volume of flow through the pass-through section 166 is regulated by the level of the liquid L within the tank 164 and the thickness to which the cake of solids of the belt 180 is allowed to build. Periodically the belt and solids collected thereon are advanced toward a discharge point 182 exterior to the tank 164 where the belt 180 and solids may be disposed of in a container 184. It should be understood that volume through the pass-through section 166 may be increased by adding a pump (not shown) to the discharge pipe 172 to increase the pressure differential across the cake of solids on the belt 180.

The liquid L being discharged through the pipe 172 is substantially free of solid particles. The cake of solids serves as a mechanical filter media which is highly efficient in effecting liquid-solid separation.

As best understood by reference to FIGS. 10 and 11, another embodiment of this invention liquid-solid separator is shown generally and designated 190.

The separator 190 is similar in design to the separator 90 to FIGS. 4-7 and likewise includes a tank 192 having an inclined end wall 194. In a like manner, the separator 190 includes a movable collection means 196 comprising a pair of spaced chains 198, 200 carrying therebetween a porous belt 202 under a plurality of transversely positioned flight baffles 204. The movable collection means 196 is formed as a continuous loop.

A bottom 206 of the tank 192 contains a pass-through section 208 made of a screen or spaced wedge wires 210 which allows a portion of the liquid L to flow into a liquid-tight compartment 212 located below the wedge wire area 210. The liquid L in the compartment 212 may be removed by pumping means (not shown), for example. The use of the pumping means to supplement the pressure created by the liquid above the pass-through section 208 provides a means of obtaining additional flow pressure without using a deeper tank.

As the liquid L with the solid particles enters the tank 192 through an inlet pipe 214, a concurrent discharge of the liquid L occurs through a weir outlet 216 formed in a sidewall 218 of the tank 192 and through the pass-through section 208. The pump, if used, is so sized that the flow through the pass-through section 208 proximates 10-15 percent with the remaining 85-90 percent of the flow passing beneath a lengthwise partition 220 through the weir outlet 216.

The solids in the flow of the liquid L are in part separated by gravity to form a cake on the belt 202. Additional solids are added to the cake by the down flow of the liquid L through the pass-through section 208 and into the compartment 212 below. Periodically the movable collection means 196 is advanced toward a discharge point 222 as was described earlier.

It should be understood that each of the separators 10, 90, 160 and 190 may be used to receive the liquid-solid flow in batches as well as continuously. Where the separator is to be used for a batch operation, the weir opening is replaced with a valve controlled outlet located at a level immediately above, for example, the flights 58 in the separator 10.

After the solids have had a sufficient time to settle from the liquid L in the tank 12, the liquid L may be withdrawn through the outlet. The solids collected may be disposed of in the container 82 in the manner discussed earlier.

As seen in FIG. 12 is a portion of a separtor 230 which includes a tank 232 having an inclined end wall 234 extending outwardly and above the tank 234 to provide an increased overall length. By increasing the length of the end wall 234, separation of liquid entrapped in the cake of solids accumulated on a belt 236 is improved because of a longer exposure time to allow gravity runoff and evaporation. Evaporation may be further increased by subjecting the cake of solids to a source of radiant heat H, for example.

As seen in FIG. 13 is a further arrangement to provide improved drying of the cake of solids before disposal. A separator 248 is provided with an extended inclined tank end wall 250 covered by a belt 251. The end wall 250 contains a perforated portion 252 serving as an inlet to an air plenum 254 carried on an underside of the end wall 250. Connected to the air plenum 254 by means of a duct 256 is an inlet blower 258. Air A over the cake of solids may be drawn through the belt 251 and the perforated portion 252 to remove entrapped liquid in the cake.

While various modifications may be suggested by those versed in the art, it should be understood that I wish to embody within the scope of the patent warranted hereon, all such modifications as reasonably and properly come within the scope of my contribution to the art.

What is claimed is:

1. A method particularly adapted for partially separating solids from a liquid comprising the steps of:
   (1) flowing a supply of said liquid with solids therein into a tank by means of an inlet pipe located in an upper portion of said tank,
   (2) maintaining a level of said liquid in said tank at a near constant level,
   (3) flowing said liquid in a nonturbulent manner in a downward direction at a selective slow rate to pass below a lengthwise partition laterally offset in said tank,
   (4) separating downwardly by gravity and by said downward flow up to 80% of said solids in said liquid as said liquid flows downwardly,
   (5) flowing said liquid and a remainder of said solids upwardly at a selective faster rate to improve said downward separation on a side opposite said partition to be discharged through a weir opening,
   (6) collecting said separated solids on a movable collection means forming in part a bottom of said tank,
   (7) advancing said movable collection means periodically toward a discharge point exterior of said tank, and
   (8) dumping said collected solids upon said solids reaching said discharge point,
   wherein a substantial volume of said liquid may be processed to separate a substantial portion of said solid within said tank having selectively small volume.

2. A method of separation as defined by claim 1 and further characterized by including,
   (9) flowing a selective small portion proximately 15% of said liquid through said movable collection means and a pass-through section formed in a bottom of said tank below said movable collection means.

3. A method of separation as defined by claim 1 and further characterized by including,
   (9) disposing of a portion of said movable collection means at said discharge point.

4. In a high volume liquid-solid separator particularly adapted for effecting partial separation, said separator, including a tank having an upper inlet to receive a flow of a liquid and solids suspended therein, the improvement thereof comrpising,
   a lengthwise partition carried by end walls of said tank to divide said tank into an inlet chamber and an outlet chamber with said inlet chamber having a dimensioned volume substantially greater than said outlet chamber to produce a slow downward flow in said inlet chamber and a faster upward flow in said outlet chamber, said partition having a bottom edge located above a bottom of said tank to allow a substantial portion of said liquid and a selective small portion of said solids exceeding 20% to flow to a weir outlet in said tank outlet chamber,
   a pass-through portion carried in a bottom of said tank to allow a remainder portion proximating 15% of said liquid to pass from tank, and
   a movable collection means in part formed into an endless loop, said means continuously covering said bottom of said tank and said pass-through section to collect a remainder portion of said solids.

* * * * *